April 26, 1960   A. AFRICANO ET AL   2,933,888
COOLING SYSTEM FOR A ROCKET ENGINE
Filed Nov. 23, 1956   2 Sheets-Sheet 2

INVENTORS
ALFRED AFRICANO
CHARLES W. CHILLSON
BY Wade Koontz
Frank C. Leach
ATTORNEYS

United States Patent Office 2,933,888
Patented Apr. 26, 1960

2,933,888

COOLING SYSTEM FOR A ROCKET ENGINE

Alfred Africano, Birmingham, Mich., and Charles W. Chillson, Packanack Lake, N.J., assignors to the United States of America as represented by the Secretary of the Air Force Application November 23, 1956, Serial No. 624,182

5 Claims. (Cl. 60—35.6)

This invention relates to a rocket engine and, more particularly, to a cooling system for the combustion chamber and the exhaust nozzle of a rocket engine.

The combustion in the combustion chamber of a rocket engine develops great heat and the hot gases passing therefrom through the nozzle heat the nozzle to a high temperature. In order to prevent damage to the combustion chamber and the nozzle such as caused by expansion, for example, it is desirable to supply a coolant fluid for cooling these parts.

An object of the present invention is to provide a cooling system for the combustion chamber and nozzle of a rocket engine that employs the fuel as a cooling fluid.

Other objects of this invention will be readily perceived from the following description.

This invention relates to a rocket engine having a combustion chamber and an exhaust nozzle. The nozzle has a plurality of members extending axially along its outer wall that are circumferentially spaced from each other. A wire is coiled circumferentially around the nozzle and the members and is secured to the members to form a coolant passage for the nozzle therebetween.

Figure 1:
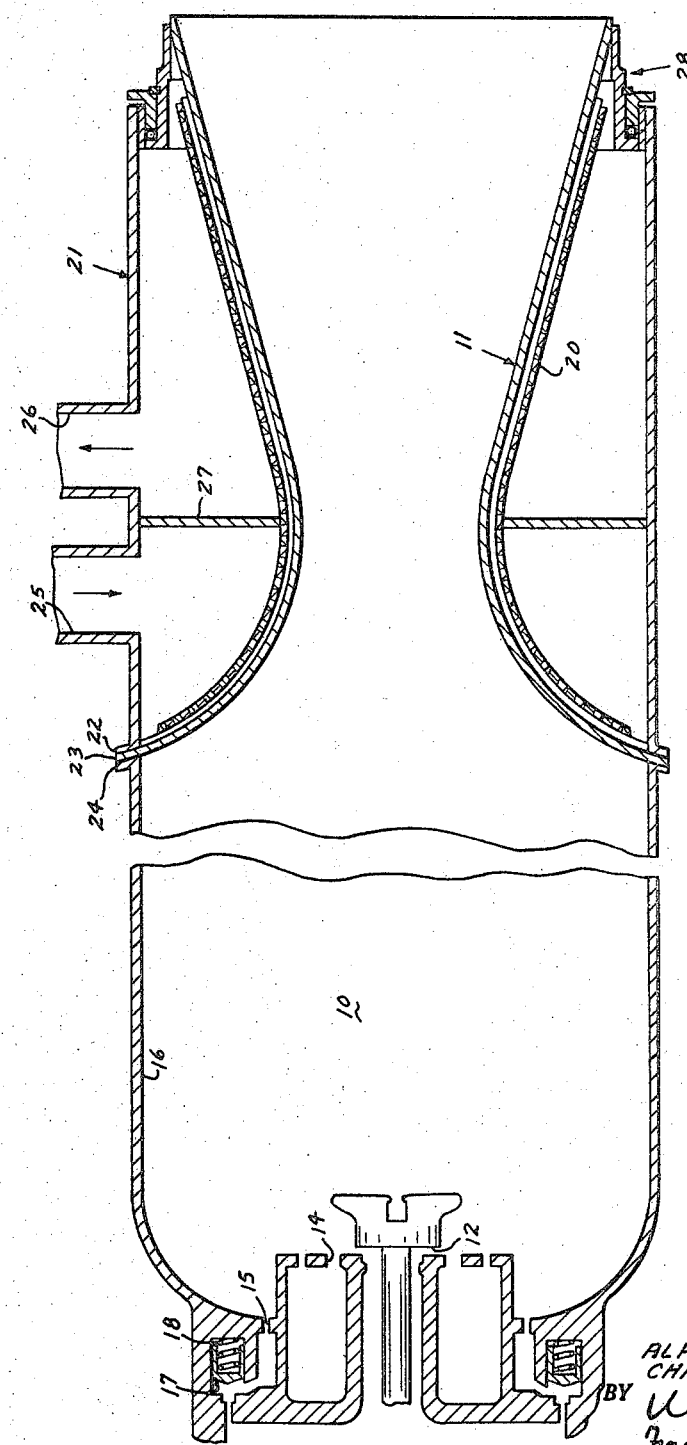
Figure 2:
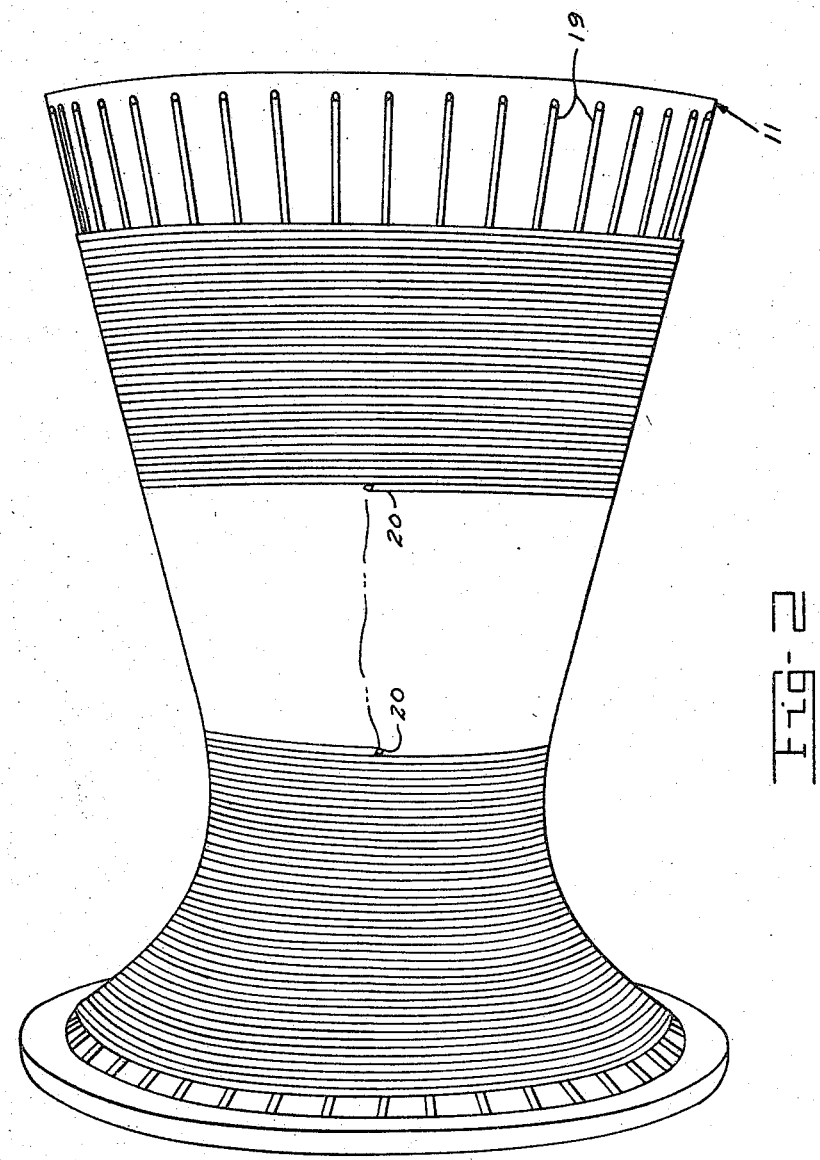

The attached drawings illustrate a preferred embodiment of the invention, in which Fig. 1 is a sectional view of a portion of a combustion chamber of a rocket engine and its exhaust nozzle including the present invention; and Fig. 2 is a perspective view of an exhaust nozzle including the present invention.

Referring to the drawings and particularly Fig. 1, there is shown a combustion chamber 10 of a rocket engine with an exhaust nozzle 11 attached at the end thereof through which the hot gases pass. Combustion occurs in the combustion chamber due to the mixing of fuel passing through the openings 12 of a fuel injector and liquid oxygen passing through the openings 14 of the fuel injector. The details of the fuel injector are disclosed in the copending application of Alfred Africano et al., Serial Number 624,180, filed November 23, 1956. Whenever there is combustion within the combustion chamber 10, fuel is supplied through openings or ports 15 to direct this fuel along the inner wall 16 of the combustion chamber 10 to cool the chamber. As combustion occurs, this fuel mixes with the combustion products issuing from the fuel injector and is completely consumed by the time it reaches the exhaust nozzle 11, which is in the form of a venturi.

Flow of fuel through the ports 15 is controlled by a valve member 17, which is normally held in a closed position by resilient means such as a spring 18 to prevent fuel flow through the ports 15. However, when fuel is supplied to the combustion chamber 10 through the openings 12 to produce combustion therein, the pressure of the fuel overcomes the force of the spring 18 and moves the valve member 17 to its open position to allow fuel to flow from the openings 15 along the inner wall 16 to cool the combustion chamber 10.

As shown more clearly in Fig. 2, the nozzle 11 is in the form of a venturi and has a plurality of rods 19 extending axially along the outer wall of the nozzle 11. A wire 20 is coiled around the nozzle 11 and the rod members 19 to form a cooling jacket for the exhaust nozzle 11. The rod members 19 are secured to the nozzle 11 by suitable means such as brazing or welding, for example. As shown in Fig. 2, the rods 19 are spaced circumferentially from each other to provide a plurality of passages therebetween. The wire 20 is preferably of substantially square cross section so that when the edges of the two adjacent portions of the wire are in contact and secured together, there is a maximum sealing therebetween. The turns of the wire are secured to each other preferably by brazing and the entire winding is then secured to the rods 19 preferably by brazing. Thus, the wire turns form a tight jacket about the nozzle 11 through which the cooling fluid is unable to diffuse.

A substantially cylindrical member 21 surrounds the nozzle 11, as shown in Fig. 1. The cylindrical member 21 has a flange 22 cooperating with a flange 23 on the nozzle 11 and a flange 24 at the end of the combustion chamber 10 to permit the parts to be joined as a unitary assembly by suitable means (not shown). The cylindrical member 21 has a conduit 25 attached thereto through which a cooling fluid is supplied to the cooling jacket of the nozzle 11 and a conduit 26 through which the cooling fluid leaves the jacket of the nozzle 11. A baffle member 27 is disposed between the inner wall of the cylindrical member 21 and the outer side of the wire 20 to separate the incoming cooling fluid from the outgoing cooling fluid. While the preferred embodiment uses the fuel, which is later supplied to the combustion chamber 10, for supply to the coolant passage between the wire 20 and the outer wall of the exhaust nozzle 11, it will be understood that any other fluid could be employed to absorb the heat of the hot gases passing through the interior of the exhaust nozzle 11. The details of the flow of the fuel to the conduit 25 and his return from the conduit 26 to the fuel injector are disclosed in the copending application of Charles W. Chillson et al., Serial Number 624,181, filed November 23, 1956.

A sealing assembly 28 is disposed between the end of the cylindrical member 21 and the end of the exhaust nozzle 11 to insure that the cooling fluid does not escape therebetween but flows through the conduit 26.

The present invention provides a cooling system for cooling both the combustion chamber and the exhaust nozzle of a rocket engine without the use of any additional fluid since the fuel is employed for cooling both. As previously explained, the combustion chamber 10 is film cooled by the fuel passing along the inner wall 16 of the combustion chamber 10. The exhaust nozzle 11 is cooled by the fuel passing through the coolant passage between the jacket formed by the turns of the wire 20 and the outer wall of the exhaust nozzle 11. This invention extends the life of the rocket engine by eliminating possible damage to the combustion chamber 10 and the exhaust nozzle 11 due to the combustion within the combustion chamber and the hot gases passing therefrom through the exhaust nozzle 11.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

We claim:

1. A rocket engine including a combustion chamber, an exhaust nozzle, a plurality of members extending axially along said nozzle and circumferentially spaced from each other, and a wire coiled circumferentially around said nozzle and said members and secured to said members to form a coolant passage for the nozzle therebetween.

2. A rocket engine according to claim 1 in which the wire is of substantially square cross section.

3. A rocket engine including a combustion chamber, an exhaust nozzle, a plurality of members extending axially along the nozzle and circumferentially spaced from each other, a wire coiled circumferentially around the nozzle and the members and secured to the members to form a coolant passage for the nozzle therebetween, means to supply a fluid to the coolant passage for circulation therethrough to cool the nozzle, and means to supply fuel along the inner wall of the combustion chamber to cool the combustion chamber.

4. A rocket engine including a combustion chamber, an exhaust nozzle, a plurality of members extending axially along the nozzle and circumferentially spaced from each other, a wire coiled circumferentially around the nozzle and the members and secured to the members to form a coolant passage for the nozzle therebetween, means to supply fuel to the coolant passage for circulation therethrough to cool the nozzle, and means to supply fuel along the inner wall of the combustion chamber to cool the combustion chamber.

5. A rocket engine according to claim 3 in which the wire is of substantially square cross section.

References Cited in the file of this patent

UNITED STATES PATENTS

| | | |
|---|---|---|
| 2,016,921 | Goddard | Oct. 8, 1935 |
| 2,093,810 | Karmazin | Sept. 21, 1937 |
| 2,526,222 | Goddard | Oct. 17, 1950 |
| 2,544,419 | Goddard | Mar. 6, 1951 |
| 2,643,863 | Buschow | June 30, 1953 |
| 2,667,740 | Goddard | Feb. 2, 1954 |
| 2,686,400 | Andrus | Aug. 17, 1954 |
| 2,705,399 | Allen | Apr. 5, 1955 |

FOREIGN PATENTS

| | | |
|---|---|---|
| 295,245 | Great Britain | Aug. 7, 1928 |